United States Patent
Lee et al.

(10) Patent No.: US 7,346,222 B2
(45) Date of Patent: Mar. 18, 2008

(54) OBJECT-OF-INTEREST IMAGE DE-BLURRING

(75) Inventors: King F. Lee, Schaumburg, IL (US); Bei Tang, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 467 days.

(21) Appl. No.: 11/052,274

(22) Filed: Feb. 7, 2005

(65) Prior Publication Data

US 2006/0177145 A1 Aug. 10, 2006

(51) Int. Cl.
*G06K 9/40* (2006.01)

(52) U.S. Cl. .................................. 382/260; 382/298

(58) Field of Classification Search ............... 382/107, 382/166, 232, 233, 235, 244, 255, 279, 289, 382/103; 348/14.13, 439.1, 568; 380/217, 380/269; 704/500, 503
See application file for complete search history.

(56) References Cited

U.S. PATENT DOCUMENTS

| | | | |
|---|---|---|---|
| 5,453,844 A * | 9/1995 | George et al. | 382/264 |
| 6,438,275 B1 * | 8/2002 | Martins et al. | 382/300 |
| 6,754,369 B1 | 6/2004 | Sazawa | |
| 6,888,566 B2 * | 5/2005 | Larkin et al. | 348/208.4 |
| 6,993,204 B1 * | 1/2006 | Yahil et al. | 382/265 |

\* cited by examiner

*Primary Examiner*—Abolfazl Tabatabai

(57) ABSTRACT

A method and apparatus for object-of-interest image de-blurring includes functions that determine (305, 310) an object region of an object-of-interest in an image that may be generated by image capture device (805), that determine (315, 825) a motion vector of the object-of-interest, that determine (325, 830) a scaling factor, and that generate (330) a de-blurred object region by processing the object region using a deconvolution filter (835) formulated from the motion vector and the scaling factor.

10 Claims, 3 Drawing Sheets

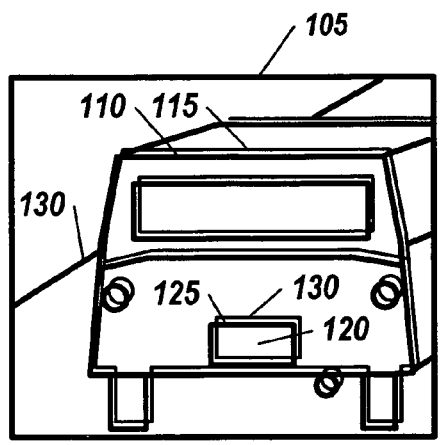
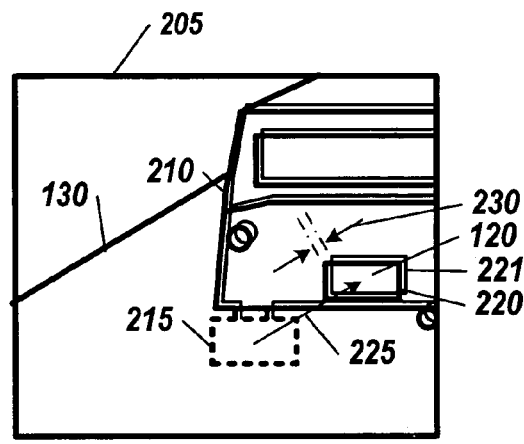
FIG. 1  FIG. 2
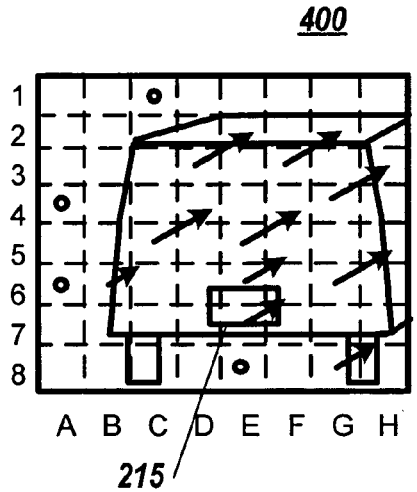
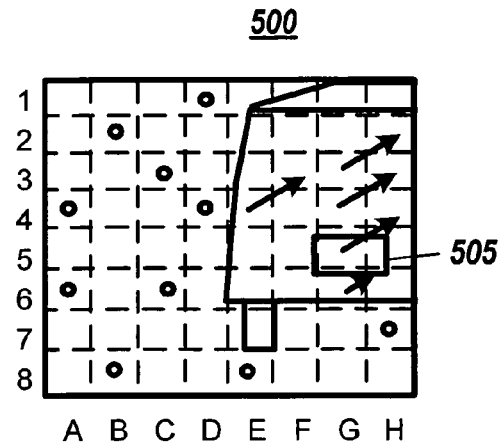
FIG. 4  FIG. 5

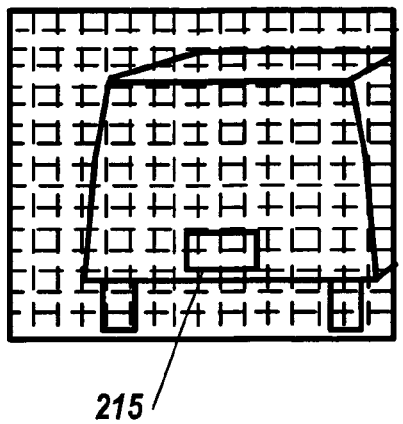
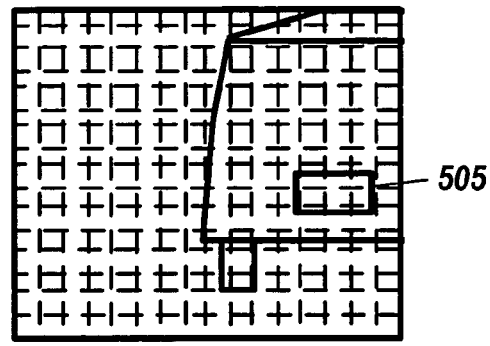
FIG. 6
FIG. 7
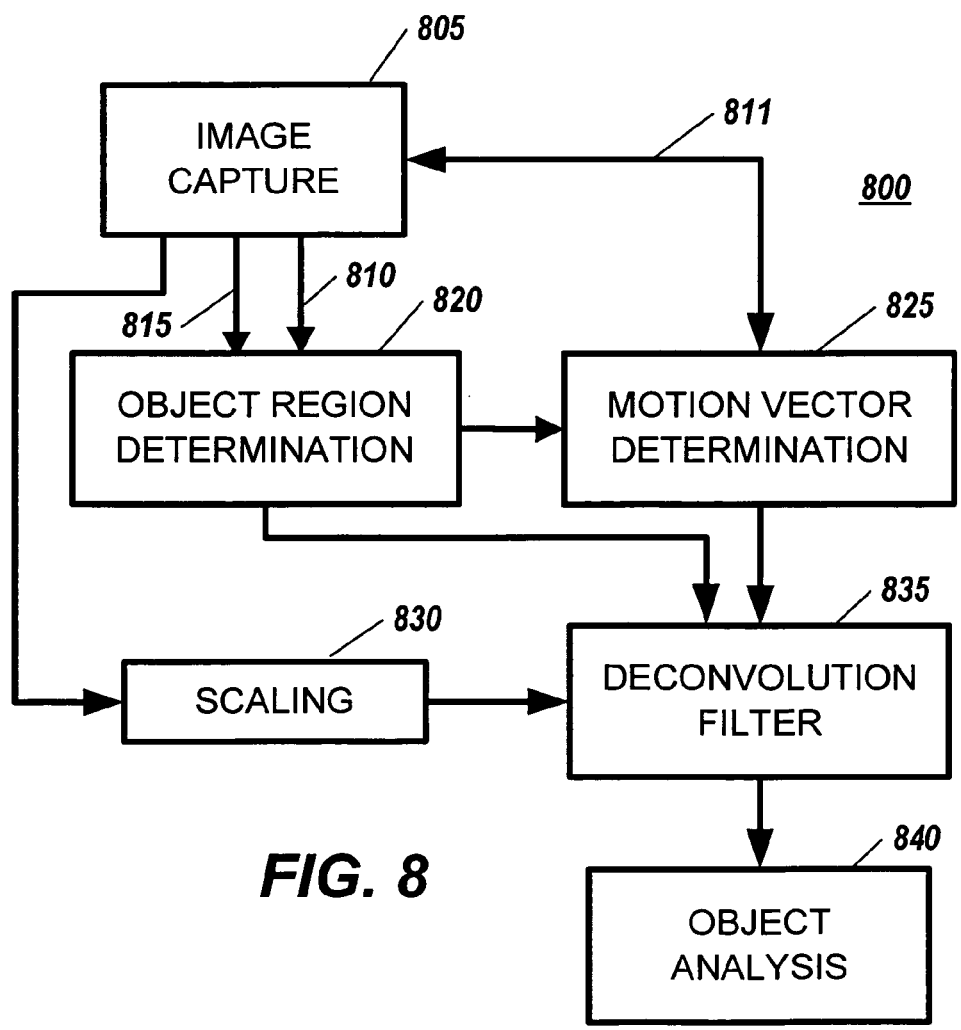
FIG. 8

OBJECT-OF-INTEREST IMAGE DE-BLURRING

FIELD OF THE INVENTION

The present invention is in the field of image processing, and more specifically in the field of digital image processing.

BACKGROUND

Performing automatic recognition of an object-of-interest within an image captured using a video camera and processed by a processing system is important for many tasks, including such tasks as person identification or license plate recognition. For objects of interest such as license plates and identification numbers (e.g., a name on a truck), the reliability of automatic recognition using a digital video camera can be lowered in currently available automated recognition systems when the camera is fixed but the object is moving, because the image of the object-of-interest becomes blurred. This effect typically starts becoming noticeable when the amount of movement of the object-of-interest causes a displacement of the image of the object-of-interest by at least a pixel during the time the image is being captured—i.e., when the shutter of the camera is opened. The blurring degrades such functions as optical character recognition of characters on the object-of-interest.

In systems that capture images of objects of interest that are moving, techniques of de-blurring of the image of the object-of-interest would be desirable.

BRIEF DESCRIPTION OF THE DRAWINGS

The present invention is illustrated by way of example and not limitation in the accompanying figures, in which like references indicate similar elements, and in which:

FIGS. 1 and 2 are simplified drawings that show features of images captured by a digital video camera, in accordance with some embodiments of the present invention.

FIGS. 4 and 5 are graphical representations of two compressed video frames captured by a video camera, in accordance with some embodiments of the present invention.

FIGS. 6 and 7 are graphical representations of two compressed video frames captured by a video camera, in accordance with some embodiments of the present invention.

FIG. 8 is a block diagram that shows means for de-blurring an object-of-interest in an image, in accordance with some embodiments of the present invention.

Figure 3:
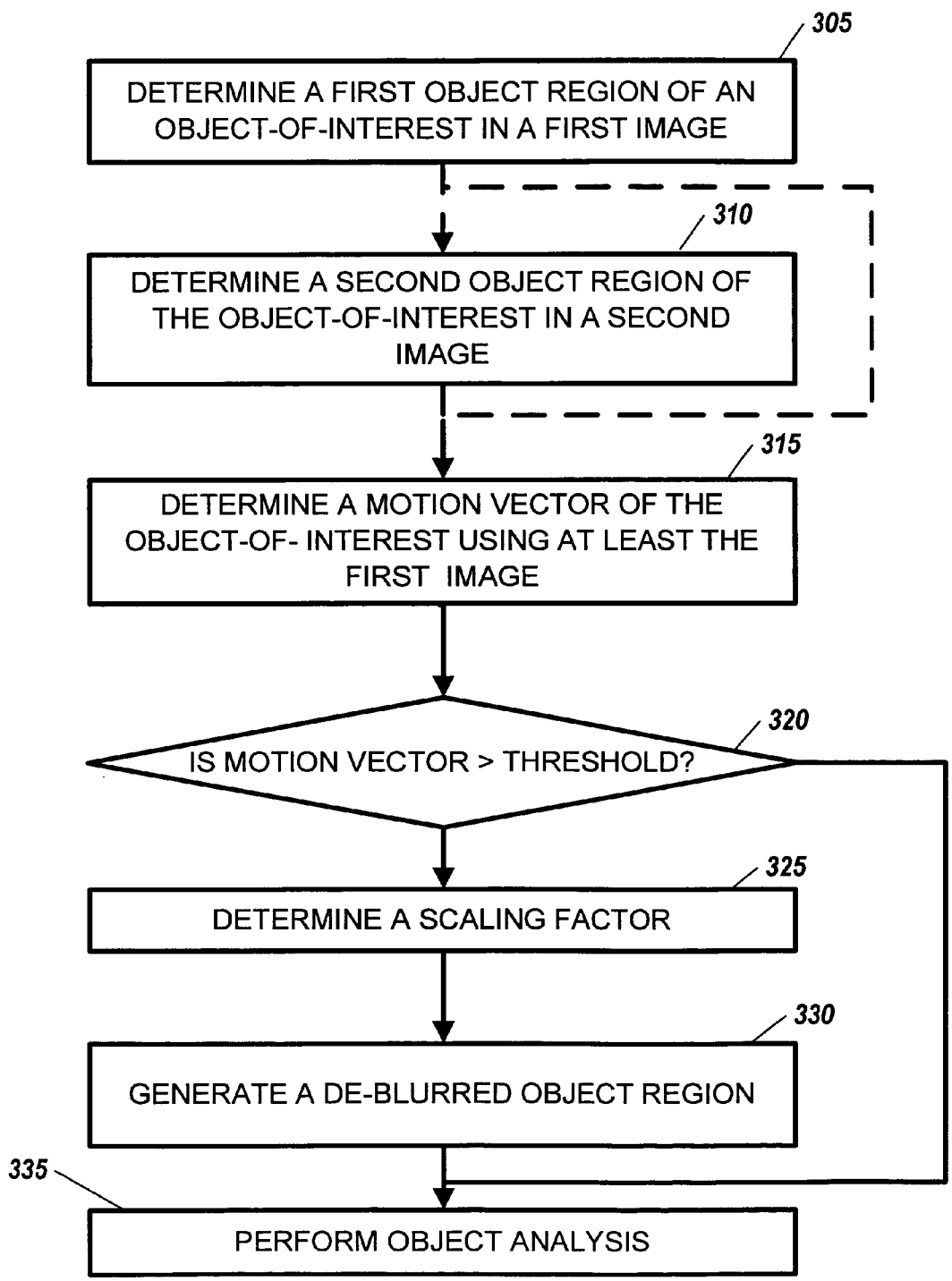
FIG. 3 is a flow chart that shows some steps of a method to de-blur an object region of an image, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

Before describing in detail the particular de-blurring apparatus and methods in accordance with embodiments of the present invention, it should be observed that the embodiments reside primarily in combinations of method steps and apparatus components related to image processing. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

It will also be understood that the terms and expressions used herein have the ordinary meaning as is accorded to such terms and expressions with respect to their corresponding respective areas of inquiry and study except where specific meanings have otherwise been set forth herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

A "set" as used in this document, means a non-empty set (i.e., comprising at least one member). The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

Referring to FIGS. 1 and 2, these simplified drawings show features of images 105, 205 captured by a digital camera, in accordance with some embodiments of the present invention. Although a digital video camera is used as an exemplary device for capturing two successive images that include an object-of-interest, it will be appreciated that other means may be used. For example, a still camera can be used to capture the two frames, or a receiver/decoder may be used to receive and decode a signal such as a compressed video data stream or an analog video signal (such as a TV signal). The features shown include a license plate 120, which is an object-of-interest for the purpose of identifying at least the license plate number. Referring to FIG. 1, a first image 105 is captured by the digital video camera, which in this example has a fixed field of view. The captured image 105 includes an image 110 of a car that is in motion along a roadway that has one edge 130 visible in the image 105. Because the car is in motion, the image 110 of the car is actually spread out slightly as depicted by the second outline 115 of the image of the car, with the amount of spread determined by at least the speed of the car and an exposure time for the image. The license plate 120 also has an image 125 that is spread out similarly to the image of the car, as depicted by the second outline 130, because the license plate 120 has the same motion as the car. The region of the image 105 that includes the spread out image of the license plate 120 identified by the image outlines 125, 130 is called the object region of the license plate 120. In these embodiments an ultimate use of the information in the object region is to recognize the characters in the license plate 120 by performing optical character recognition. It will be appreciated that the blurring of the image of the license plate 120 in the object region may degrade the reliability of the optical character recognition.

Referring to FIG. 2, a second image 205 has been captured by the digital camera after the first image 105 has been captured, at a time interval determined by a frame rate of the digital video camera. In this example, the car is moving away from the camera and is moving up and to the right within the frame images 105, 205. In the second image 205, a second object region of the license plate is a region that includes the areas 220 and 221. In the second image 205, the position of the first object region within the boundaries of the second image 205 is superimposed on the second image 205 as outline 215. The movement of the object-of-interest is depicted on the second image 205 as a motion vector 225 that extends from a centroid of the object region 125, 130 in the first image 105 to the centroid of the object region 220, 221 of the second image 205. The amount of blurring, which is the amount by which the image of the license plate moves in the second image is depicted as a magnitude 230, which is the magnitude of a "blurring" motion vector that is related to the motion vector 225 by a scaled amount (and having the same direction). The scaling factor that is used to define the blurring as a scaled motion vector is determined as a ratio of the exposure time (ET) of the captured image (in seconds) to the time interval (or frame interval, FI) between the first and second images, which in the case of a digital video camera is the inverse of the frame rate (in seconds), which may be expressed as ET/FI. The scaled magnitude of the motion vector 225 may be expressed in a variety of ways. For example, it may be expressed as a number of pixels. Alternatively, it may be expressed as a fraction of a dimension of the images 105, 205, such as the width, length, or diagonal. For example, when the frame rate is 10 frames per second, and the exposure time is $\frac{1}{200}^{th}$ of a second, and the motion vector is 125 pixels long, the blurring would be about 6 pixels. In the same example, when the motion vector is 0.20 the length of the diagonal of the image, then the blurring would be 0.01 of the diagonal dimension of the image 205. The exposure time may be determined by, for example, a duration of a shutter opening, or by a digital control of an on time of pixel imaging devices.

Referring to FIG. 3, a flow chart shows some steps of a method to de-blur an object region of an image are shown, in accordance with some embodiments of the present invention. At step 305, a first image, such as image 105 of FIG. 1, is processed to find a region within the image that is likely to contain an object-of-interest, such as the license plate 120 (FIG. 1). The processing may be done using one of or a combination of a variety of techniques known to those of ordinary skill in the art, or by using techniques not yet known. For example, known edge enhancement techniques may be combined with known line determination techniques and known geometric techniques to determine whether the image likely includes an image of an object that is rectangular, even when the plane of the rectangular object shape is not perpendicular to the central axis of the field of view of the camera. When such an object-of-interest is determined to have an appropriate likelihood of being in the target image, an object region that includes the object-of-interest is identified by boundaries within the target image, such as the boundaries 125, 130 of FIG. 1, which may be rendered as a rectangle that encompasses the entire blurred image of the license plate. The boundaries are determined essentially by the same techniques used to identify the likely occurrence of the object-of-interest within the target image. It will be appreciated that the boundary will be a non-rectangular quadrilateral when the license plate is not perpendicular to an axis of a field of view of the camera. When an object region is determined to have occurred within the target image at step 305, the image capture process continues in some embodiments by proceeding to step 310, in which a determination is made of a second object region that includes the object-of-interest in a second image that has been captured by the camera. In some embodiments, the images are successive frames of a series of video frames taken at a periodic rate. In other embodiments, the pictures may not be periodic frames. For example, in some embodiments, an object that is found in a first image may trigger the capture of the second image. In some embodiments the object-of-interest is an object that includes characters and symbols, such as alphanumeric characters and symbols. Examples of such an object are a license plate and a sign on a side of a vehicle such as a railway car. At step 315, a motion vector of the object-of-interest is determined using at least the first image. In some embodiments, both steps 305 and step 310 are performed and the motion vector is determined as being a displacement vector that indicates the displacement between the centroids of the first and second object regions, using techniques known to those of ordinary skill in the art. When the second frame is captured after the first frame, the displacement vector is typically determined as the displacement of the centroid of the second object region with reference to the centroid of the first object region. An example of such a motion vector is shown in FIG. 2 as motion vector 225. An example of another technique to acquire the motion vector is described with reference to FIGS. 4 and 5.

Referring to FIGS. 4 and 5, graphical representations of two compressed video frames 400, 500 captured by a video camera are shown, in accordance with some embodiments of the present invention. The compressed video frames 400, 500 represent frames that include the images 105, 205 of the examples used in the description above with reference to FIGS. 1 and 2. For simplicity, only the outline of object regions 215, 505 and outlines of the car are shown from the images 105, 205. The graphical representation 400 (FIG. 4) shows the first object region 215 of the first image 105 and also shows 64 sub-frame regions of that image, also known as blocks, each identifiable by a row and column identifier. In these embodiments the images are compressed according to a compression technique that generates compressed image data as well as a block motion vector for each block. A data stream is generated that includes the compressed block image data and values of the block motion vectors as information. One example of such compression techniques are the Motion Picture Experts Group's (MPEG's) compression schemes such as MPEG-2 and MPEG-4, but the embodiments are not limited to only those standards, and FIGS. 4 and 5 are not meant to be exact representations of them. A few of the block motion vectors are illustrated in FIGS. 4 and 5. Motion vectors for blocks 1C, 4A, 6A, and 8E in FIG. 4 are illustrated with a circle, indicating no motion of the image with respect to a previous image in those blocks. Motion vectors for blocks 3D, 3F, 4G, 5C, 5E, and 6G in FIG. 4 are illustrated by vector symbols having a common length that represents the motion of all the pixels in the block (as determined from the two frames) moving at the rate and direction of the image of the car. Motion vectors for blocks 6B, 6E, 7E, and 8G in FIG. 4 are illustrated by vector symbols having lengths (not necessarily the same) that each represent an integration of the motions of all the pixels in the respective block moving at differing rates that include, in this example, pixels moving at the rate and direction of the image of the car and pixels that are not moving. The graphical representation 500 (FIG. 5) shows the second object region 505 of the second image 205 and also shows 64 compressed block regions of that image, each identifiable by a row and column identifier. Again, some motion vectors of the blocks are shown, with circles indicating no motion, the longest vectors indicating the common motion of all pixels in blocks, and shorter vectors indicating some moving pixels and some stationery pixels. It will be appreciated that the magnitude of the motion vector is based on the displacement of pixels relative to a previous (or next) frame of the video sequence. Thus, as in the description above with reference to FIGS. 1 and 2, the amount of blurring can be determined by the scaling factor described above and the motion vector. In accordance with these embodiments, a motion vector for the first object region may be determined from a value of a motion vector of a sub-region that includes a portion of the first object region 215, such as the block that includes the largest portion of the first object region 215. Alternatively, the motion vector of the first or second object region 215, 505 may be determined using values of motion vectors of a plurality of blocks that include at least a portion of the object regions 215, 505 in the first and second images. For example, in some embodiments, the values of the motion vectors of the block in each of the first and second images 400, 500 that has the largest portion within the first and second object regions 215, 505 are averaged together to determine a motion vector of the second object region 505. Many other techniques are possible, such as using block motion vectors only from either the first or second object regions 215, 505, or combining block motion vectors from a plurality of blocks that include portions of the first or second object region 215, 505, in a weighted manner. In those embodiments that use only the block motion vectors of the blocks that include a portion of the first object region 215 to determine the motion vector of the first object region 215, step 310 of FIG. 3 may be eliminated.

Referring again to FIGS. 6 and 7, graphical representations of two compressed video frames 600, 700 captured by a camera are shown, in accordance with some embodiments of the present invention. In these embodiments, a block matching motion vector estimation algorithm may be used to determine a motion vector for the first or second object region 215, 505. The compressed video frames 600, 700 represent frames that include the images 105, 205 of the examples used in the description above with reference to FIGS. 1 and 2. The graphical representation 600 (FIG. 6) shows the first object region 215 of the first image 105 and also shows 256 compressed blocks of that image. In these embodiments the images may be divided into uncompressed blocks of image data, as may the case for image data from a camera that does not get compressed, or image data that is compressed by another electronic device. In these embodiments, characteristics of the portions of the images that are in one or more of the blocks of the second image 700 are compared to the portions of the images in a set of the blocks that are in the first object region 215 of the first image 600, and when a sufficient match is found between a set of blocks in the second image 700 and the set of blocks in the first image 600, a motion vector is estimated using a block matching motion vector estimation algorithm. An exemplary motion vector estimation algorithm is given by:

$$\overline{MV} = \min_{(dx,dy) \in RR} \sum_x \sum_y |g_k(x, y) - g_{k-1}(x + dx, x + dy)|, (x, y) \in OR$$

Wherein:

dx is the displacement in x;

dy is the displacement in y;

RR is the search window;

$g_k(x,y)$ is the value at pixel location (x,y) for the kth frame; and

OR is the object region.

After the motion vector of the object region is determined according to any of the embodiments described above with reference to FIG. 1-4 and FIGS. 6-7, or any other known or new method, a determination is made at step 320 (FIG. 3) as to whether the magnitude of the motion vector exceeds a threshold. When the magnitude of the motion vector does not exceed the threshold, then the motion is too small to warrant processing the object region for de-blurring, object analysis is performed at step 335, as described in more detail below. When the magnitude of the motion vector does exceed the threshold, then the scaling factor, ET/FI, is determined at step 325 as described above with reference to FIGS. 1 and 2. Using the motion vector and the scaling factor, the first or second object region is processed at step 330 to de-blur the first or second object region. The de-blurring is accomplished using a deconvolution filter, and the coefficients of the deconvolution filter are based on a point spread function that is formulated based on the motion vector and scaling factor. For example, the point spread function for a linear motion in a horizontal direction may be expressed as:

$$h(x, y) = \frac{1}{\Delta x} \frac{FI}{ET} rect\left(\frac{x}{\Delta x} \frac{FI}{ET} - \frac{1}{2}\right) \delta(y)$$

Wherein:

h(x,y) is the point spread function;

ET is the exposure time;

FI is the frame interval;

rect(.) is the rectangular function;

δ(.) is the impulse function;

Δx is the motion vector, in this case in a horizontal direction only; and x and y are positions within the object region.

Although this exemplary formula is for horizontal motion only, a formula for a more general motion having both x and y components can be derived from this formula by the well known techniques for rotation in an x-y plane.

The de-blurring filter may be chosen from known types of deconvolution filters, of which two are given below; an inverse filter and a Weiner filter. Both are based on the above point spread function using a frequency transformed version of the point spread function, as is known to one of ordinary skill in the art.

Inverse Filter $$H^{-1}(\varpi 1, \varpi 2) = \begin{cases} \dfrac{1}{H(\varpi 1, \varpi 2)}, & H \neq 0 \\ 0, & H = 0 \end{cases}$$

Wherein:

$H(\omega 1,\omega 2)$ is the Fourier transform of the point spread function $h(x,y)$.

Weiner Filter $$W(\varpi 1, \varpi 2) = \frac{H^*(\varpi 1, \varpi 2) S_{gg}(\varpi 1, \varpi 2)}{|H(\varpi 1, \varpi 2)|^2 S_{gg}(\varpi 1, \varpi 2) + S_{nn}(\varpi 1, \varpi 2)}$$

Wherein:

$H^*(\omega 1,\omega 2)$ is the complex conjugate of $H(\omega 1,\omega 2)$;

$S_{gg}(\omega 1,\omega 2)$ is the Fourier spectrum of the signal; and $S_{nn}(\omega 1,\omega 2)$ is the Fourier spectrum of the additive noise.

When the de-blurring of the object region has been completed at step 330, the object region may then be processed for object analysis at step 335. The processing for object analysis may include adjusting the object region to compensate for an object-of-interest that has not been captured at an optimum angle. For example, a license plate object region that has boundaries that are not essentially perpendicular may be manipulated to a rectangular object. This may be particularly important for an object-of-interest such as a license plate, for which the analysis is optical character recognition.

Referring to FIG. 8, a block diagram shows means for de-blurring an object-of-interest in an image 800, in accordance with some embodiments of the present invention. The means for de-blurring 800 comprises an image capture means 805, which may be, for example, a video or "still" camera, or a decoder. When the image capture means 805 is, for example, a video or still camera, de-blurring of the object-of interest may be accomplished when the camera captures two images at a time interval that can be determined using an exposure time that can be determined. De-blurring of the object-of interest may also be referred to as de-blurring an object region, which is a region of the image that is predicted to include the object-of-interest. When the image capture means 805 is a decoder, de-blurring of an object region may be accomplished when the decoder decodes at least one image and motion vectors for the at least one image from a compressed or non-compressed video information signal. The motion vectors should be for substantially small regions of the one image that are on the order of a size of an object region of an object-of-interest within the image, and for which information about the time interval between the one image and a previous image from which the motion vector is derived is available and an exposure time of the at least one image is available. The image capture means 805 is coupled to an object region determination means 820, which locates an object region of an object-of-interest within at least one image that is coupled by signal 810 to the object region determination means 820, as described above with reference to FIG. 3, steps 305, 310. In some embodiments the object determination means 820 stores the image information of one or two object regions from a corresponding one or two images. When two images are coupled, the second image may be coupled by signal 815. In some embodiments a motion vector determination means 825 is coupled by signal 811 to the image capture means 805. The motion vector information is extracted by the image capture means 805 from a video information signal as described above with reference to FIGS. 4 and 5, or block displacement is determined from block information as described above with reference to FIGS. 6 and 7, or centroid displacement is determined as described above with reference to FIGS. 1 and 2. A scaling factor determination means 830 is coupled to the image capture means to obtain image interval (frame interval) information and the exposure time information and from them determines the scaling factor, as described above with reference to FIGS. 1 and 2. The motion vectors and scaling factor are coupled from the motion vector determination means 825 and the scaling factor determination means 830 to a deconvolution filter means 835 which determines a point spread function that is used to define a deconvolution filter to process one of the first and second object regions that is coupled from the object region determination means 820. The processed object region is coupled to an object analysis means 840 that analyzes the object region, for example, by performing optical character recognition.

By now it will be appreciated that the use of the motion vector and scaling factor to establish the coefficients of a deconvolution filter accomplishes a de-blurring of an object region in a unique manner, and thereby provides significantly improved analysis of an object-of interest in a video frame, or in any two successive images captured by a fixed camera.

It will be appreciated the embodiments described herein may be comprised of one or more conventional processors and unique stored program instructions that control the one or more processors to implement, in conjunction with certain non-processor circuits, some, most, or all of the functions of the embodiments described herein. The non-processor circuits may include, but are not limited to, a radio receiver, a radio transmitter, signal drivers, clock circuits, power source circuits, and user input devices. As such, these functions may be interpreted as steps of a method to perform accessing of a communication system. Alternatively, some or all functions could be implemented by a state machine that has no stored program instructions, in which each function or some combinations of certain of the functions are implemented as custom logic. Of course, a combination of the two approaches could be used. Thus, methods and means for these functions have been described herein.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method for object-of-interest image de-blurring, comprising:

determining an object region of an object-of-interest in a first image;

determining a motion vector of the object-of-interest from the first image and a second image;

determining a scaling factor as a ratio of the exposure time (ET) of the first image to the frame interval (FI) between the first and second images; and generating a de-blurred object region by processing the object region using a deconvolution filter formulated from the motion vector and the scaling factor.

2. The method according to claim 1, further comprising: performing object analysis using the de-blurred object region.

3. The method according to claim 1, wherein determining a motion vector of the object-of-interest further comprises: determining another object region of the object-of-interest in the second image.

4. The method according to claim 3, wherein determining a motion vector of the object-of-interest further comprises determining the motion vector as a displacement vector between centroids of the object region and the other object region.

5. The method according to claim 3, wherein determining a motion vector of the object-of-interest further comprises using a block matching motion vector estimation algorithm.

6. The method according to claim 3, wherein the first image and the second image are successive frames of a video sequence.

7. The method according to claim 1, wherein determining a motion vector of the object-of-interest comprises obtaining the motion vector from motion vector information contained in a compressed video sequence.

8. The method according to claim 1, wherein coefficients of the deconvolution filter are based on a point spread function that is formulated based on a scaling of the motion vector using the scaling factor.

9. A means for de-blurring an object-of-interest, comprising:
 a means for image capture;
 a means for determining an object region of an object-of-interest in a first image captured by the means for image capture;
 a means for determining a motion vector of the object-of-interest from the first image and a second image;
 a means for determining a scaling factor as a ratio of the exposure time (ET) of the first image to the frame interval (FI) between the first and second images; and
 a means for generating a de-blurred object region by processing the object region using a deconvolution filter formulated from the motion vector and the scaling factor.

10. An apparatus for de-blurring an object-of interest, comprising:
 a digital camera that captures images; and
 a processor that performs the following functions:
  determining an object region of an object-of-interest in a first image;
  determining a motion vector of the object-of-interest from the first image and a second image;
  determining a scaling factor as a ratio of the exposure time (ET) of the first image to the frame interval (FI) between the first and second images; and
  generating a de-blurred object region by processing the object region using a deconvolution filter formulated from the motion vector and the scaling factor.

* * * * *